F. H. BASSETT.
ANIMAL TRAP.
APPLICATION FILED DEC. 8, 1908.
1,006,046.
Patented Oct. 17, 1911.
2 SHEETS—SHEET 1.
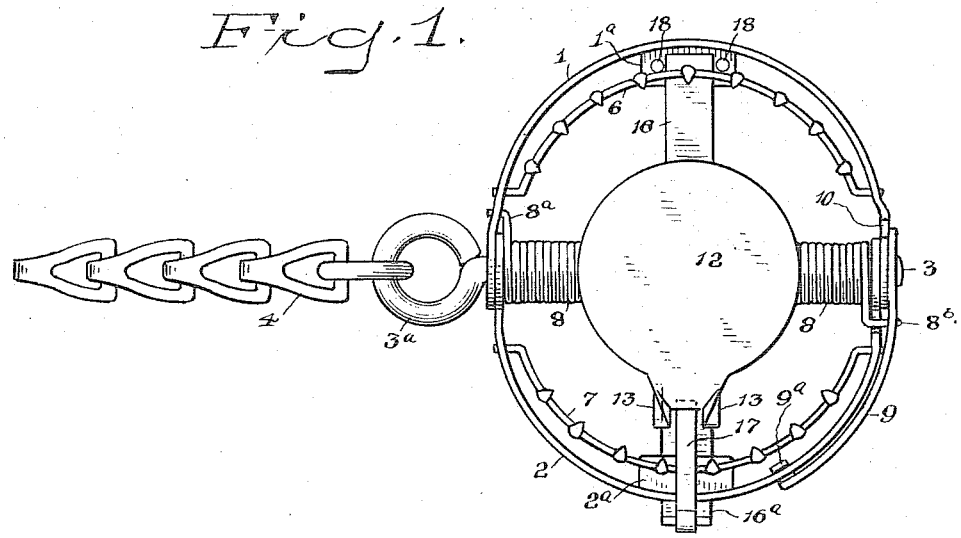
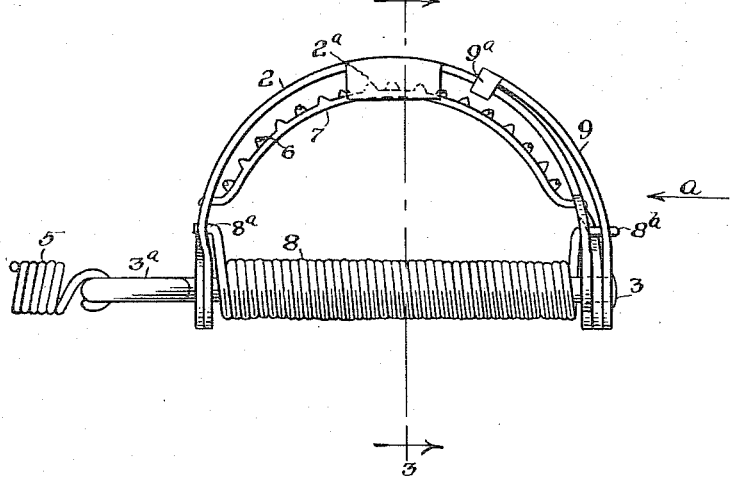
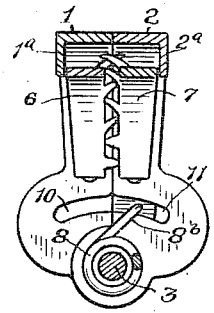
Inventor
Fred H. Bassett.

F. H. BASSETT.
ANIMAL TRAP.
APPLICATION FILED DEC. 8, 1908.

1,006,046.

Patented Oct. 17, 1911.
2 SHEETS—SHEET 2.

UNITED STATES PATENT OFFICE.

FRED H. BASSETT, OF OAKVILLE, CONNECTICUT.

ANIMAL-TRAP.

1,006,046.   Specification of Letters Patent.   Patented Oct. 17, 1911.

Application filed December 8, 1908. Serial No. 466,444.

*To all whom it may concern:*

Be it known that I, FRED H. BASSETT, a citizen of the United States, and a resident of Oakville, in the county of New Haven and State of Connecticut, have invented certain new and useful Improvements in Animal-Traps, of which the following is a specification.

My invention relates to animal traps and it has for its object to provide means whereby the tension on the jaws is entirely released while the trap is being set, and, further, to provide outer and inner jaws, the inner jaws actuated to close with the outer ones, but otherwise independent in their action when the pressure of the outer jaws is relieved.

My invention further consists in a detachable bait-pan adapted to be released from the trap as soon as it is sprung.

Figure 4:
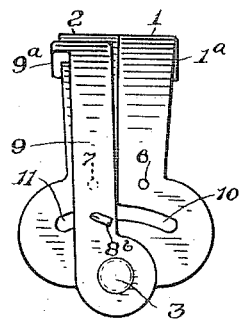
Figure 5:
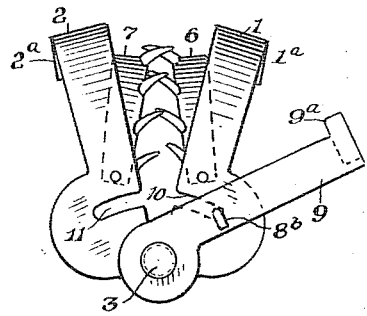
Figure 6:
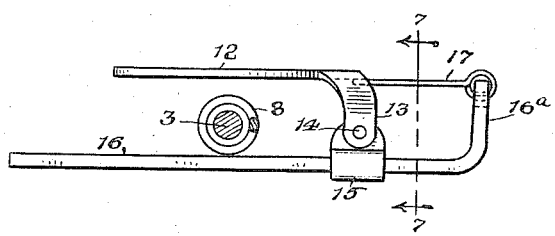
Figure 7:
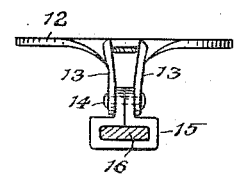

To enable others to understand my invention, reference is had to the accompanying drawings, in which:

Figure 1 represents a view showing the trap open and set; Fig. 2 a side elevation of the trap closed; Fig. 3 is a section on line 3 of Fig. 2; Fig. 4 is an end elevation looking in the direction of arrow *a* of Fig. 2; Fig. 5 is a similar end elevation of the trap except that the outer jaws are partially opened with the spring tension removed and the inner jaws closed; Fig. 6 is a detail side elevation of the bait-pan and its support, and sectional view of the spring and swivel rod; and Fig. 7 is a sectional view on line 7 of Fig. 6.

The outer jaws 1 and 2 are devoid of teeth and are journaled on the swivel rod 3. One end of the chain 4 is attached to the eye $3^a$ of this rod, and the coiled spring 5 (Fig. 2) may be interposed between the chain and rod 3 to afford a yielding pull on the chain.

The inner jaws 6 and 7 are provided with teeth and are journaled in the outer jaws as shown. The coiled tension spring 8 loosely embraces the rod 3 with one end, $8^a$, anchored in the outer jaw 1, and the other end $8^b$ anchored in the tension lever 9, journaled on the outer end of the rod 3. The curved slots 10 and 11, in one end of the outer jaws, afford means for the travel of the end $8^b$ of the spring when the tension on the outer jaws is either applied or released. When the tension is on the outer jaws, the lever 9 is swung around until its lip $9^a$ embraces the outer edge of the jaw 2 as shown at Figs. 1, 2 and 3, and when the tension is released, the lever is thrown around in the position shown at Fig. 5.

The bait-pan 12 is provided with the ears 13, which ears are journaled on the pin 14 projecting through the upper end of the chair 15. This chair is made of a single piece of metal embracing the base or bar 16, and is adapted to be adjusted thereon to locate the bait-pan in proper position with respect to the locking latch 17, which latch is journaled in the upper end of the upright portion $16^a$ of the base. When the proper position of the bait-pan has been established, the chair 15 may be immovably secured to its support.

As the inner jaws are fully journaled in the outer jaws and have a movement independently of such outer jaws, when the tension of the spring 8 is released, the lips $1^a$ and $2^a$, integral with said outer jaws, are provided to carry the inner jaws along with the outer jaws when the trap is sprung, as will be hereinafter more fully explained.

In setting the trap, the tension on the outer jaws is first released by disconnecting the clasp end of the lever 9 from the outer jaw 2, when the stored up tension of the spring 8 will throw such lever over into the position shown at Fig. 5. The tension being thus released, the four jaws can be freely opened without fear of any accident occurring from immature closing. The bait-pan is next inserted as follows: The base 16 (Fig. 6) is passed under the tension spring 8 with its free end resting (see also Fig. 1) on the lip $1^a$ of the outer jaw 1 and between the locating pins 18, which pins will prevent this end of the bar slipping off the said lip while the trap is being set. The latch 17 is then thrown over the outer and inner jaws 2 and 7 with its free end placed between the ears of bait-pan and resting against the under-surface of said pan, and is temporarily held in this position by one hand while the tension lever 9 is brought around with the other hand and clasped to the outer edge of jaw 2. This movement of the lever 9 will store up sufficient tension in the spring 8 to forcibly close the jaws when the latch 17 is released from the bait-pan. When the trap is sprung, as when an animal steps on the bait-pan, the outer jaws, in closing, will, by reason of the lips $1^a$ and $2^a$, carry the inner jaws with them, and this closing movement of the jaws will also throw the bait-pan clear of the trap. This detachable feature of the bait-pan is important in view of the fact that when the trap is sprung, there is no danger of its being injured by being thrashed against the ground. With the ordinary single jawed trap it frequently happens that an animal will pull open the jaws far enough to liberate the foot, but where inner jaws are provided, as in my construction, and these journaled independently on the outer jaws, it would be impossible for both sets of jaws to be opened, and especially when the inner ones are provided with teeth. Releasing the jaws of all spring tension while the trap is being set eliminates all danger to the operator that frequently occurs, especially in large traps, by immature closing of the jaws.

While I show the spring tension device used in connection with two sets of jaws, I desire it to be distinctly understood that I hold myself at liberty to use said device with a single pair of jaws.

Having thus described my invention, what I claim as new and desire to secure by Letters Patent is:

1. An animal trap comprising outer and inner jaws, the inner jaws serrated and journaled to the outer jaws, said outer jaws adapted to be practically opened without opening the inner jaws, and means on said outer jaws to engage with, and close the inner jaws.

2. An animal trap comprising outer and inner jaws and a tension spring, the inner jaws journaled to the outer jaws so that the latter may have an opening movement independently of the former, a support on which the outer jaws are journaled, the outer jaws actuated to close by means of said spring, means on the outer jaws to close the inner jaws, a tension lever adapted to store up tension on the spring to set the trap when the jaws are in full open position and release the tension when the jaws are closed, for the purpose set forth.

3. An animal trap comprising outer jaws, a support on which said jaws are journaled, inner jaws journaled in the outer jaws, a tension spring engaging the outer jaws to close the same, means on said outer jaws to actuate the inner jaws to close with the outer jaws, a tension lever connected with said spring and adapted thereby to store up tension in the spring to set the trap, means for locking said lever to one jaw, for the purpose set forth.

4. An animal trap comprising outer and inner jaws, a support for the outer jaws, said inner jaws journaled in the outer jaws, a tension spring engaging the outer jaws, a spring tension controlling device adapted to store up tension in the spring and engage with one of said jaws in setting the trap and be released therefrom to relieve the jaws of spring tension, means on the outer jaws to engage with and close the inner jaws when the trap is sprung, and a bait-pan, for the purpose set forth.

Signed at Bridgeport in the county of Fairfield and State of Connecticut this 7 day of Dec. A. D. 1908.

FRED H. BASSETT.

Witnesses:
 Geo. D. Phillips,
 John B. Clapp.